(12) United States Patent
Kline et al.

(10) Patent No.: US 6,782,122 B1
(45) Date of Patent: Aug. 24, 2004

(54) APPARATUS FOR MEASURING HEIGHT OF A LIQUID IN A CONTAINER USING AREA IMAGE PATTERN RECOGNITION TECHNIQUES

(75) Inventors: Bruce R. Kline, Starksboro, VT (US); Mokhtar M. Sadok, Vergennes, VT (US); William B. Spillman, Jr., Floyd, VA (US)

(73) Assignee: Simmonds Precision Products, Inc., Charlotte, NC (US)

( * ) Notice: Subject to any disclaimer, the term of this patent is extended or adjusted under 35 U.S.C. 154(b) by 0 days.

(21) Appl. No.: 09/559,620

(22) Filed: Apr. 27, 2000

(51) Int. Cl.$^7$ .................................................. G06K 9/00
(52) U.S. Cl. ................................... 382/142; 250/223 B
(58) Field of Search ................................ 382/100, 141, 382/142, 143; 348/125, 127; 250/223 B; 356/240.1, 239.1, 239.2, 239.3, 239.4, 239.5; 209/524, 526; 73/49.3, 45, 45.1; 117/14

(56) References Cited

U.S. PATENT DOCUMENTS

| | | | |
|---|---|---|---|
| 3,995,169 A | | 11/1976 | Oddon |
| 4,006,988 A | | 2/1977 | Tamm |
| 4,396,943 A | | 8/1983 | Lord et al. |
| 5,021,665 A | | 6/1991 | Ames |
| 5,253,032 A | * | 10/1993 | Higaki et al. ............... 356/3.04 |
| 5,274,429 A | | 12/1993 | Misawa et al. |
| 5,414,778 A | | 5/1995 | Schwartz et al. |
| 5,521,694 A | | 5/1996 | Osterwalder |
| 6,106,612 A | * | 8/2000 | White ......................... 117/14 |
| 6,516,661 B1 | * | 2/2003 | Spillman et al. ............. 73/149 |

FOREIGN PATENT DOCUMENTS

| | | |
|---|---|---|
| DE | 19605006 | 8/1997 |
| EP | 0381894 A1 | 8/1990 |
| EP | 0 655610 A2 | 5/1995 |
| GB | 1 561 667 | 2/1980 |
| GB | 1 561 668 | 2/1980 |
| JP | 0814992 | 1/1996 |
| JP | 10160842 | 6/1998 |
| WO | WO 95/05583 | 2/1995 |

* cited by examiner

*Primary Examiner*—Vikkram Bali
(74) *Attorney, Agent, or Firm*—David R. Percio; Calfee, Halter & Griswold LLP (57) ABSTRACT

This disclosure is directed to apparatus for measuring height of a surface of liquid in a container utilizing a light source and camera pair disposed above the liquid surface in a predetermined spatial relationship to each other and the container. The light source illuminates the liquid surface with a light pattern and the camera captures the area image of the light pattern in a form of discrete picture elements (pixels) that are processed in an image processor to determine the height of liquid in the container. In another embodiment, the pixels of the area image are further processed to determine attitude of the liquid surface so that the processor may determine the quantity of liquid in the container based on the determined height and attitude of the liquid surface and container geometry data stored in a memory thereof. In yet another embodiment, a plurality of light source/camera pairs are disposed above the liquid surface, each pair operates by capturing an area image of the light pattern on a portion of the liquid surface illuminated by its light source. The pixels of the area image of each pair are processed in the image processor to determine the heights of the corresponding liquid surface portions. In still another embodiment, a plurality of cameras are disposed above the liquid surface to observe at least one light pattern at different viewing angles. Each camera captures an area image of the at least one light pattern and the pixels of such area images are processed in the image processor to determine at least one height for the liquid surface in the container. In this embodiment, the image processor may include an algorithm for combining together the pixels of the various area images of the plurality of cameras to determine the at least one liquid surface height.

29 Claims, 10 Drawing Sheets

APPARATUS FOR MEASURING HEIGHT OF A LIQUID IN A CONTAINER USING AREA IMAGE PATTERN RECOGNITION TECHNIQUES

BACKGROUND OF THE INVENTION

The present invention relates to the field of liquid measuring, in general, and more particular, to the measurement of a height and/or quantity of the liquid in a container based on area image processing of one or more light patterns projected onto the liquid surface.

Sensing a distance to an object using a projected beam of light is well known. For example, U.S. Pat. No. 5,521,694 (the "'694 patent") is directed to a system utilizing a laser beam for sensing distance to an object for identifying characteristics of a liquid in a container, like the level of the liquid, the identification and locations of interfaces between liquids and identifying particles in a liquid at different depths and locations among other physical features of the liquid. The system of the '694 patent generates a laser beam to an object, like the surface of a liquid, for example, and receives light reflected from the surface through an optical arrangement that projects a spot image onto a linear array of photo diodes or charge coupled devices (CCDs). The resulting output of the linear array is processed to determine the distance to the object surface. Individual elements of the array are electrically separated from each other to create a built in micro scale for use as fixed reference points in identifying distance to the object. These types of systems rely solely on a single point of light are thus highly sensitive to alignment of its optical elements which may easily be disturbed by external forces such as vibrations, shocks and the like. Accordingly, any disturbance in alignment will cause significant errors in measurement.

Another application for sensing distance to an object with projected light is in conventional auto focus cameras. For example, the U.S. Pat. Nos. 5,274,429 and 5,253,032 are directed to distance measuring systems using one or more projected light beams to determine the focal distance to a desired object to be photographed. These systems propose to solve the problem of autofocusing when there is more than one object to be photographed in a common frame of the camera. The '429 patent is directed to projecting light beams to a plurality of distance measuring points and receiving the reflected light beams from said points onto photo sensing devices (PSDs). While the patent describes various embodiments using a plurality of light sources and plurality of PSDs, all of the embodiments appear to process only the photocurrents output from the PSDs and the ratios thereof for focal distance determination. The '032 patent is directed to the use of modulated infrared (IR) light and a PSD which outputs photocurrents in accordance with the incidence position of the reflected light from the desired object or objects to be photographed. These types of systems are not of the variety that measure a physical quantity of the object from the resulting distance measuring data.

The present invention proposes to solve the drawbacks of these background systems by simplifying the structure and relying more on the processing of area image patterns for the determination of object distances to measure physical quantities of a liquid, thus diminishing the sensitivity to alignment of optical elements and improving the accuracy of the liquid measurements.

SUMMARY OF THE INVENTION

In accordance with the present invention, Apparatus for measuring height of a surface of liquid in a container comprises a light source disposed above the liquid surface for illuminating the liquid surface with a pattern of light; means for capturing an area image of the light pattern in a form of discrete picture elements (pixels); and means for processing the pixels of the area image to determine the height of said liquid surface in the container. In one embodiment, the processing means includes means for processing the pixels of the area image to determine attitude of the liquid surface in the container; a memory for storing data representative of the geometry of the container; and means for determining the quantity of liquid in the container based on the determined height and attitude of the liquid and the container geometry data.

In accordance with another aspect of the present invention, the apparatus for measuring height of a surface of liquid in a container comprises a plurality of light sources disposed above the liquid surface, each light source for illuminating a portion of the liquid surface with a pattern of light; image capturing means corresponding to each light source of said plurality, each means for capturing an area image of said light pattern illuminated by its corresponding light source in a form of discrete picture elements (pixels); and means for processing the pixels of the area image of each image capturing means of said plurality to determine the height of said liquid surface in the container. In another embodiment, each light source and its corresponding image capturing device are disposed in a predetermined spatial relationship with each other to function together as a pair for a predetermined portion of the liquid surface; and the processing means processes the pixels of the area image of each image capturing means to determine the heights of the liquid surface for the corresponding predetermined portions.

In accordance with a further aspect of the present invention, the apparatus for measuring height of a surface of liquid in a container comprises at least one light source disposed above the liquid surface for illuminating the liquid surface with at least one pattern of light; a plurality of image capturing means disposed above the liquid surface for observing the at least one light pattern at different viewing angles, each means for capturing an area image of said at least one light pattern in a form of discrete picture elements (pixels); and means for processing the pixels of the area image of each image capturing means to determine at least one height for the liquid surface in the container. In yet another embodiment, the processing means includes means for combining together the pixels of the area images of the plurality of image capturing means to determine the at least one liquid surface height.

DETAILED DESCRIPTION OF THE INVENTION

Figure 1:
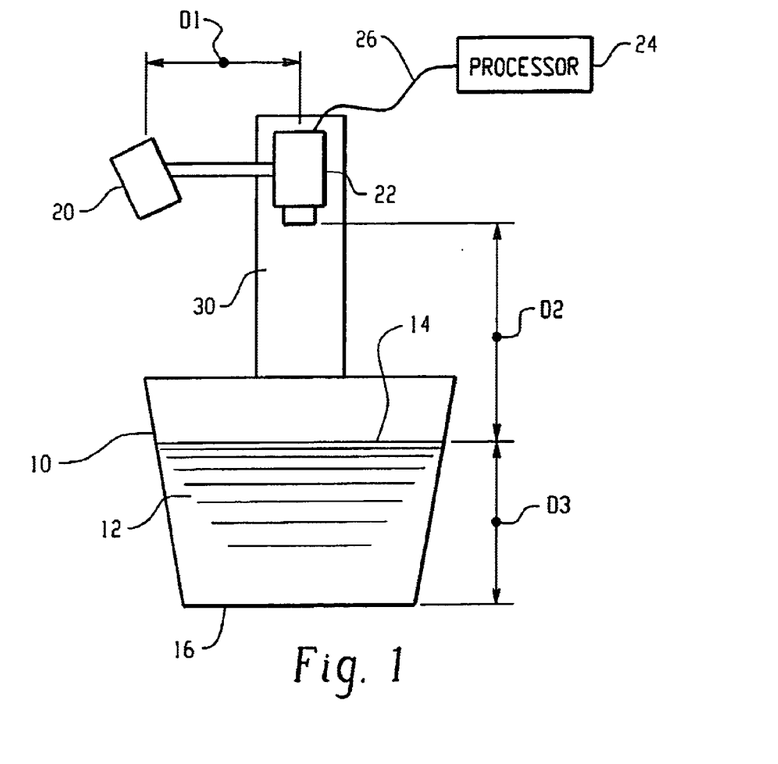
FIG. 1 is an illustration of an exemplary embodiment of the principle of the present invention.

A simple system suitable for embodying the concepts of the present invention is shown by way of example in the sketch of FIG. 1. Referring to FIG. 1, a container or tank 10 holds a quantity of liquid 12 at a level or height D3 above the container base. The plane or height and attitude of the fluid surface 14 may be used to determine the quantity of fluid in the container 10 with a prior knowledge of the geometry of the container 10. The container 10 in the present embodiment may be a fuel tank of an aircraft holding a quantity of fuel that is to be determined in accordance with the principles of the present invention.

In the present embodiment, a light source 20 is disposed above the liquid 12 at the tank 10 at a predetermined distance D2+D3, which may be on the order of eight (8) feet, for example, from the tank base 16 for illuminating the liquid surface with a pattern of light (not shown). Also included in the embodiment is a device 22 for capturing an area image of the light pattern illuminating the liquid surface 14. Device 22 may be disposed at the tank 10, at the same height as the light source 20, and horizontally displaced from the light source 20 by a predetermined distance D1, which may be on the order of six (6) feet, for example. The aiming axes of the light source 20 and device 22 are oriented at a predetermined angle with respect to each other, which angle may range between zero degrees and ninety degrees, for example, depending on the setup, the tank structure and other such factors, for example. The capturing device 22 may be set to have a fixed focusing so that all of the tank depth is "observed" by the device. The light source 20 and device 22 may be supported in place by a conventional structure 30, which may be comprised of the body of the tank itself. While in present embodiment, the light source 20 and image capturing device 22 are supported above the liquid surface 14 at the same height, it is understood that they may be at different heights and orientations with respect to each other so long as the spatial relationship therebetween and with the container 10 are known and input to the processor 24 for determining the height and attitude of the fluid surface. It is further understood that while the devices 20 and 22 are shown separated by a distance D1 in the present embodiment, they may also be coplanar, i.e. D1=0, without deviating from the principles of the present invention.

Figure 2:
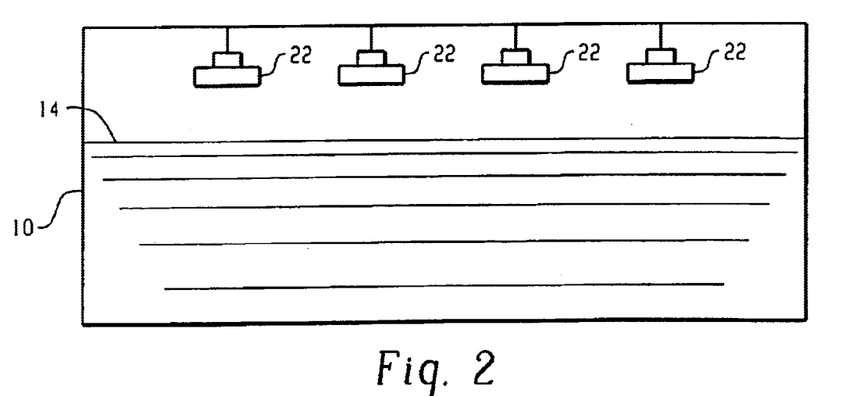
FIG. 2 is an illustration of an alternate embodiment of the principles of the present invention.

In addition, while only one image capturing device 22 is shown in the embodiment of FIG. 1, it is understood that more than one device may be displaced horizontally to each other by a known distance for imaging the same or other pattern illuminations of the liquid surface. FIG. 2 illustrates such an alternate embodiment of multiple devices 22 supported above the liquid surface 14 at the tank or container 10. In this embodiment, each camera may have its own structured light source 20(not shown) and monitor only a particular surface of the liquid 14 on which its respective pattern of illumination appears. In this case, each pair of devices 20 and 22 would act as a single probe or sensor for detecting the height of the liquid surface at a designated location or portion of the liquid surface 14. Three or four such device pairs would be considered sufficient to determine a plane of the liquid surface from which volume and/or mass may be determined. In an alternate embodiment, all of the capturing devices 22 may monitor an area of the liquid surface 14 on which one or more patterns are illuminated, albeit at different angles. The resulting images captured by the devices 22 may be combined together to determine an estimate of the plane of the liquid surface in the down stream processing thereof as will become better understood from the description hereinbelow. For example, such processing may include stereo vision algorithms or other fusing, integrating and/or interpreting techniques to combine the resulting area images from the capturing devices 22.

Referring back to FIG. 1, the output of the device or devices 22 is (are) coupled to a processor 24 over one or more signal lines 26. Each device 22 may output its captured area image of the liquid surface in the form of discrete picture elements or pixels at a predetermined image sampling rate and the processor 24 processes the picture elements in a way that will become more apparent from the description found herein below to determine the height and attitude (i.e. plane) of the fluid surface 14. When two or more devices 22 are used, the processor 24 may employ stereo vision algorithms or other combining techniques to determine the height and attitude of the fluid surface among other features thereof. The processor 24 also contains in a memory thereof data that is representative of the geometry of the container or tank 10 so that it may determine the quantity of fluid 12 in the container 10 based on a function of the height and attitude of the liquid surface 14 and the data representing the container geometry. This determination of liquid quantity will also become apparent from the description found hereinbelow.

In one embodiment of the present invention, the light source 20 may be of the type to illuminate the fluid surface 14 with a pattern of light comprising a plurality of spots. In this embodiment, the pattern of spots may include three or more in a non-linear arrangement. For this purpose, a light source for generating structured lighting is preferred. By way of example, structured lighting may be embodied by at least one laser diode and an arrangement of optical elements for guiding the light from the at least one laser diode to project the pattern of spots on the fluid surface. In an alternate light source embodiment, an incandescent lamp, a lamp reflector, and a baffle containing openings may be conventionally assembled for projecting the pattern of spots on the fluid surface. Incandescent lamps with a 50,000-hour lifetime at rated voltage are conventional. However, by reducing the operating voltage levels to 80% or so, for example, the lifetime increases by more than ten times making incandescent lamps comparable to the 100,00 hour lifetime semiconductor or solid state laser diodes.

In another embodiment, the light source 20 may be of the type to illuminate the fluid surface with a cross hair pattern or cone of light. For this purpose, an area illumination lighting is preferred, like, for example, an assembly of an incandescent lamp or laser, with or without a lamp reflector, and baffle with an opening in the form of a cross hair or circle pattern or alternatively, an array of high luminance light emitting diodes (LEDs) in the form of a cross hair or circle pattern, for example. The light source embodiment having a circle pattern will project a cone of light to illuminate the fluid surface with an elliptical light pattern having major and minor axes. A circled light pattern, which may arise from the projected cone of light under the conditions of a level fluid surface, is considered a subset of the possible elliptical patterns where the major and minor axes are equal. It is understood that other light sources may be used to project a cone of light onto the liquid surface, such as an assembly of a lamp, laser or LED, and a lens, or holographic element to direct light (and possibly an aperture to shape the beam of light), for example. In fact, many light sources naturally project a cone of light without additional optical elements.

Examples of solid state light sources that are suitable for use in the embodiments described in connection with the system of FIG. 1 are laser diodes manufactured by OpCom under the model number OLX, laser projectors (includes optics) that may produce lines, dotted lines, dot matrixes, single and concentric circles and cross-hair patterns manufactured by Lasiris under the model number SNF-501L, or LED arrays manufactured by DVT or Photonic Detectors, Inc. Preferred is an LED area array illuminator that operates in a range of wavelengths substantially at 925 nanometers.

In the embodiments of FIGS. 1 and 2, the image capturing device 22 comprises some form of camera that generates area image samples, preferably in the form of frames or half-frames of discrete picture elements or pixels at a predetermined image sampling or frame rate. Cameras for this purpose are available with 0, 1, and 2 spatial dimensions as output; intensity can provide another dimension and color two more beyond that. A single photocell can be used for light absorption and point level gauging. A linear array may be used with a triangulation method for a single axis, but an area array is preferred for the direct observation method of the present embodiment, which can be used for multi-axis triangulation as will become apparent from the description found hereinbelow. Intensity is also used with the image array cameras to extend spatial resolution by detecting partially illuminated picture elements or pixels in the area image or frame. Color may be useful for the direct observation technique to help distinguish between tank hardware and fuel. Monochromatic area cameras are considered to best support all of the imaging techniques of the present embodiment. The monochromatic camera is preferred over color cameras in the important parameters of size, resolution, and sensitivity. Even color may be addressed with a monochromatic camera. Monochromatic cameras (with IR cut filters removed) are usable into the near UV and near IR greatly extending the spectrum available. For example, infrared lasers and LEDs can be used as a light source and incandescent lamps can be run at a low temperature greatly extending their life. Color information can still be attained from a monochromatic camera by varying the color of the light source.

Of the many types of monochromatic area video cameras, solid state imagers are preferred for size and reliability reasons. However, it is understood that other arrays of photodiodes, high speed charge coupled devices or CCDs, slow scan CCDs, large area formats, cooled arrays, and a host of other variants are suitable for use in the present embodiment, but may be expensive. Sensitivity is one area of concern because it impacts the design of the light source. Two types of solid state imager cameras: the CCD video camera and the CMOS video camera have the desired features of: (1) small format which drives the entire size of the camera and lens system, (2) high sensitivity which is useful for a solid state light source and saves power, and (3) small electronics module which helps with reliability, ease of mounting, and low weight.

CCD cameras are a mature product line with good sensitivity (0.2 Lux). On the negative side, they need an electronics module and a fair amount of power. Charge coupled devices require hefty drivers to clock out the data. It should be noted though that the electronics have been miniaturized to an acceptable level. Examples of CCD video cameras suitable for use in the embodiment of FIG. 1 are of the type manufactured by Sony under the model numbers SSD-D5, DXC-3000A, and ICX076AL, of the type manufactured by OpCom under the model number BM26, and of the type manufactured by Texas Instruments under the model number TCK237. Preferred is the OpCom video camera that has a resolution of 510×492 pixels per frame, a sensitivity of 0.2 lux with a F1.4 lens, an entire module platform with lens of 30×30×28 mm, and operates at 100 mA and 12VDC.

CMOS imagers are relatively new but rapidly displacing CCDs in cost and battery operation especially for personal computer (PC) video imagers. Imagers of this type feature total integration of all electronics on an imaging integrated circuit (IC) chip. They also operate with very little power because of the circuit integration, the CMOS process of manufacture, and their low power current clock drivers for the pixel image shift registers. Generally the CMOS imagers currently available are not as sensitive as CCDs but the difference is small and growing smaller rapidly. Examples of CMOS imagers suitable for use in the embodiment of FIG. 1 are of the type manufactured by VLSI Vision under the model number VM5400 and of the type manufactured by Marshall Electronics under the model number V-007. Preferred is the VLSI imager at 0.5 lux sensitivity with a filter that passes light in the 925 nm range to increase contrast at the color at which aircraft fuel is most opaque.

Imagers or video cameras of the aforementioned type typically produce a full interlaced frame image 30 times a second and half frames (i.e. half the resolution) 60 times a second. Line to line samples or horizontal scan rates are typically on the order of 15 KHz depending on resolution, and pixel to pixel samples typically range from 10 MHz to 40 MHz. For a typical video camera with a basic 30 Hz frame rate, the vertical and horizontal resolution determine the horizontal scan and pixel rates. For specialized cameras (including some CCDS), the pixel samples rate and resolution may determine the other sample rates.

Figure 3:
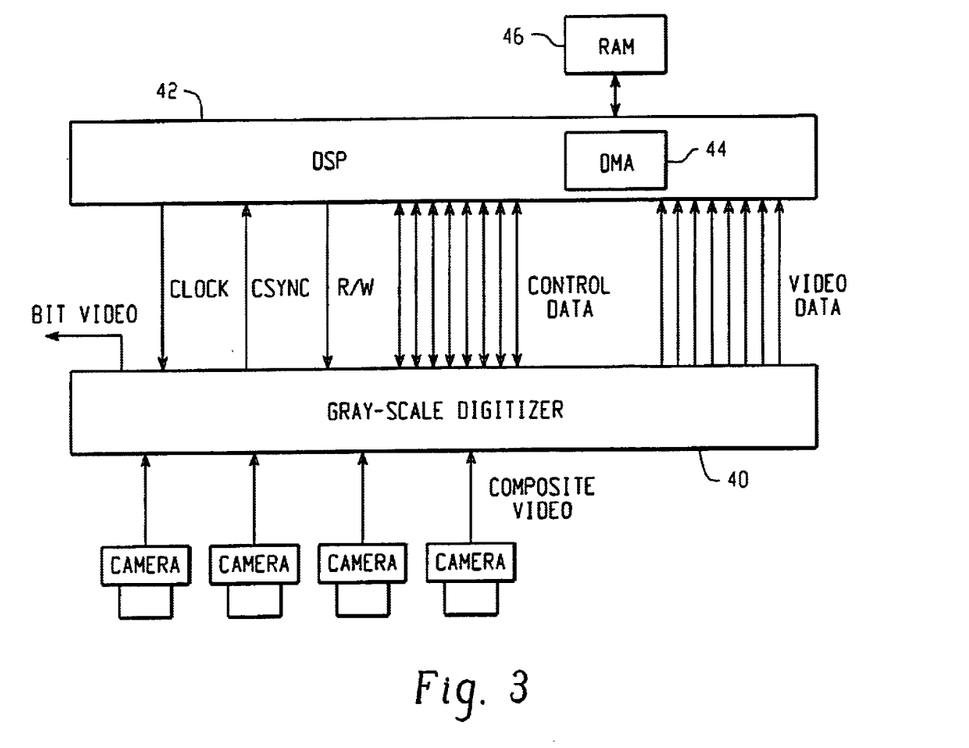
FIG. 3 is a block diagram schematic of an image processing embodiment suitable for use in the embodiments illustrated in FIGS. 1 and 2.

The image capturing device 22 of the aforementioned types includes both a video camera and a frame grabber, not shown in FIGS. 1 and 2, that operates in synchronization with the pixels clocked out of the camera to digitize the pixels, index the pixels in accordance with their position in the area image sample, and store them in portions of a memory designated for each area image sample produced by the camera. A frame grabber having precision spatial input characteristics as well as control of input gain and offset to optimize the image for post processing tasks is preferred. Frame grabbers of this type include a digital signal processor and dedicated memory for buffer storage of the digitized pixels of the image samples. A block diagram schematic of a suitable frame grabber for use with the device 22 in the embodiments of FIGS. 1 and 2 is shown in FIG. 3. Referring to FIG. 3, one or more video cameras are coupled to a digitizer 40 which in turn is controlled by a digital signal processor 42 that has a direct memory access (DMA) module 44 and a dedicated memory module of the random access memory (RAM) type 46. In operation, the images captured by the various cameras are prefiltered and digitized in the digitizer 40 and provided to the DSP 42 and RAM 46 for image processing.

Figure 4:
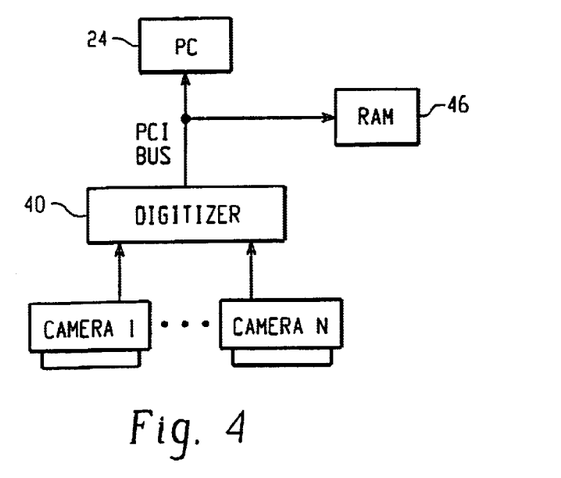
FIG. 4 is a block diagram schematic of an alternate image processing embodiment suitable for use in the embodiments illustrated in FIGS. 1 and 2.

In an alternate embodiment exemplified by the block diagram illustration of FIG. 4, a PCI bus of the host processor 24 that may be a conventional personal computer (PC) is interfaced directly with the digitizer 40 to coordinate processing of the image pixels to permit the PC 24 to index and store the digitized pixels of the area image samples or frames of the camera(s). The PCI bus of the personal computer or PC which may be of the type manufactured by Intel Corporation under the model name Pentium™ is considered fast enough to conduct the digitized pixels of the area image samples directly from the digitizer in real time to its dedicated RAM and its video memory and display. Use of the PCI bus off loads image processing time and memory to the PC 24, thus reducing the cost of the imager 22 and increasing flexibility. In addition, the ability to communicate images directly to the PC's video circuitry allows for a real time display of the image samples or frames.

Figure 5:
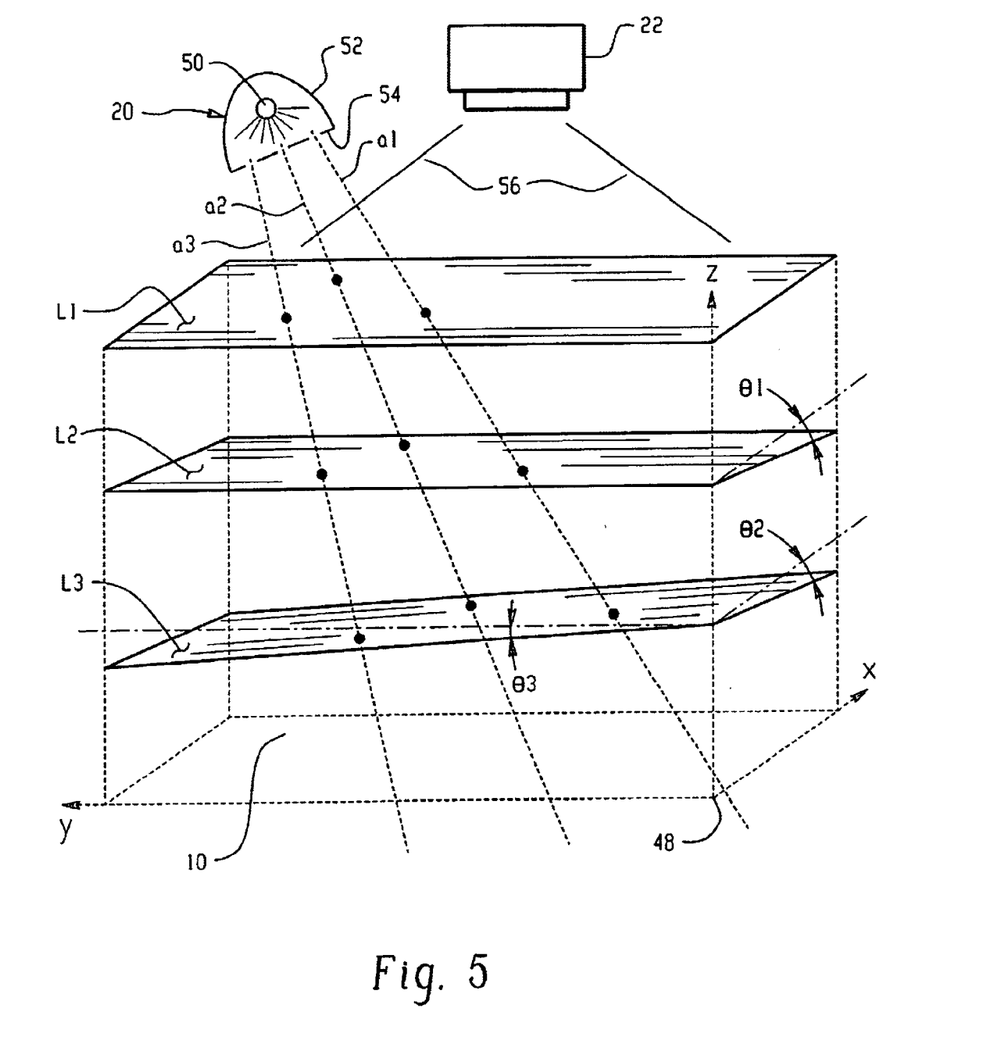
FIG. 5 is an illustration of another embodiment of the present invention.

In the embodiment of the present invention in which the surface of the fluid is illuminated with a light pattern of three light spots, the processor 24 which may be a PC includes one or more software algorithms for analyzing the digitized pixels of each image frame to compute the distance to the illuminated pattern from a reference point, like the camera position, for example, by analyzing spot positions within the area image or frame of pixels, and to determine the orientation of the fluid plane, i.e. the height and attitude of the fluid surface, based on the determined distances of the spot illuminations. To better understand this aspect of the present invention, the illustration of FIG. 5 depicts the fluid in the tank 10 at three different levels and orientations L1, L2 and L3. The tank 10 is shown rectangular in shape having a Cartesian axes formed with an origin at the corner 48 of the tank base with liquid level being measured along the z axis with respect to the tank base. The x and y axes of the Cartesian system form level planes at the liquid levels along the z axis from which to measure liquid surface attitude. For example, fluid surface level L1 is shown level and parallel to the x-y plane of the Cartesian system, the fluid surface at L2 is shown with an attitude angle $\theta 1$ in the x-z plane, and the fluid surface of L3 is shown with attitude angles of $\theta 2$ and $\theta 3$ in the x-z and y-z planes, respectively.

In this example, the light source 20 includes an incandescent lamp 50, a lamp reflector 52 and a baffle 54 disposed in front of the lamp 50 and having three openings to project light along three corresponding axes illustrated by the dashed lines a1, a2 and a3, respectively, to illuminate the fluid surface at the exemplary levels L1, L2 and L3 with three light spots represented by the darkened circles at each level. The imager 22 includes in its field of image view 56 the portions of the fluid surface that are being illuminated by the spot patterns covering a spectrum from full to empty levels. Area images of the surface levels L1, L2 and L3 are captured by the imager 22 and digitized, indexed and stored by the frame grabber as described in connection with the circuitry of FIG. 3 or by the PC processor 24 as described in connection with FIG. 4, supra. These digitized images are provided to the processor 24 for post processing by software algorithms to determine the height and attitude of the exemplary levels L1, L2 and L3 as well as the quantity of fluid in the tank for these three levels.

Figure 6A:
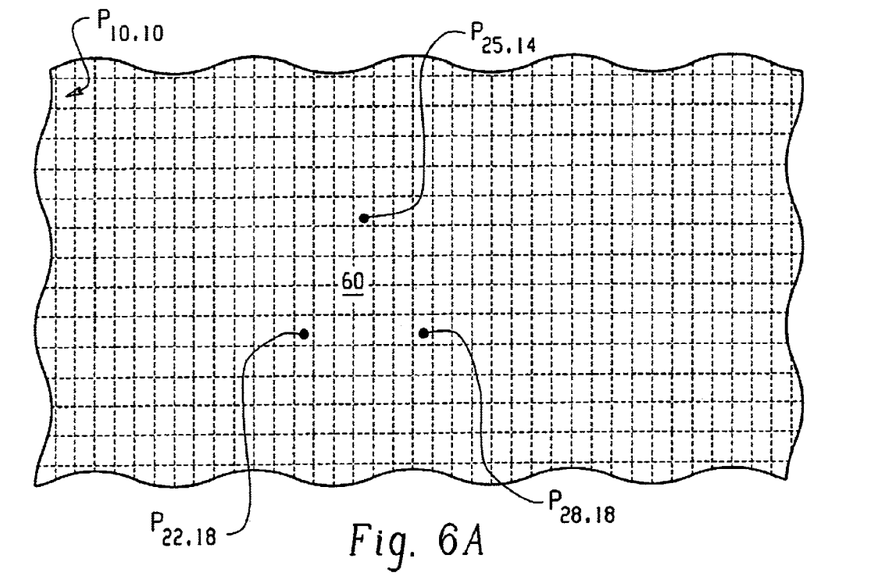
FIGS. 6A, 6B and 6C are illustrations of area images in the form of pixels for various liquid levels exemplifying an operation of the embodiment of FIG. 5.
Figure 6B:
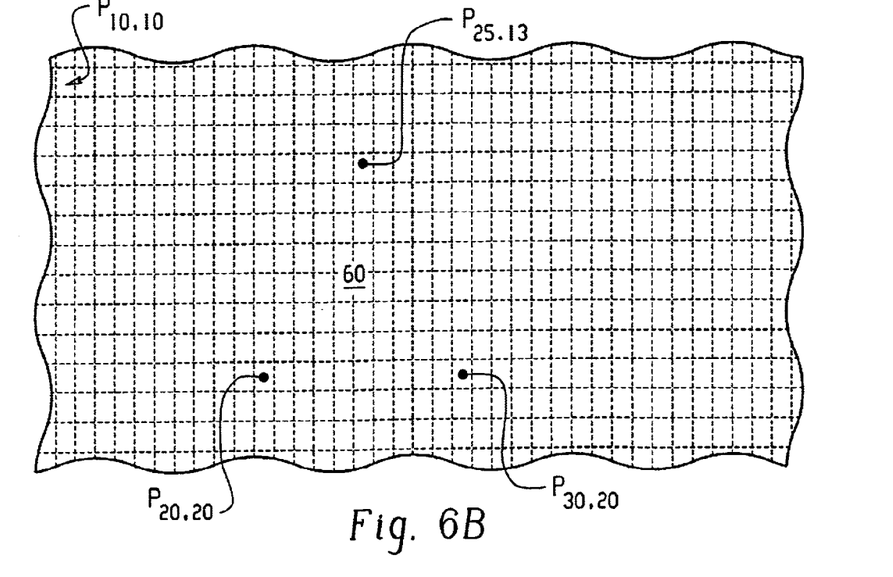
Figure 6C:
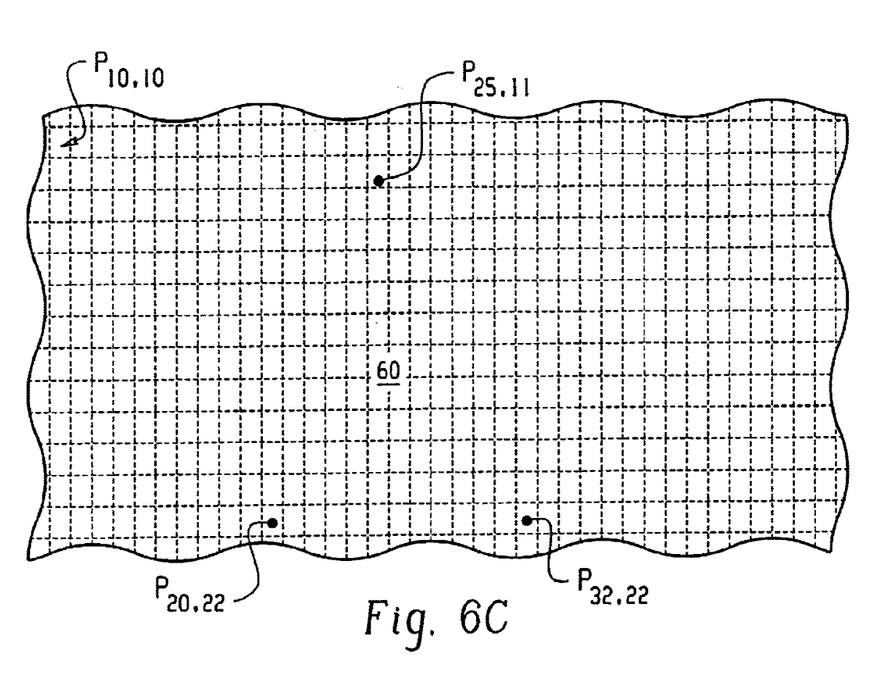

Three area images or frames of pixels observed by the imager 22 at the corresponding liquid levels L1, L2 and L3 are shown by way of example in FIGS. 6A, 6B and 6C, respectively. In FIGS. 6A, 6B and 6C, indexed pixels designated as $P_{x,y}$ are represented by the small squares. The x indexing thereof begin at the top of the area image and increase downwardly and the y indexing begin at the left of the image and increase from left to right. A reference pixel $P_{10,10}$ is shown in the upper left hand corner of the area image. In the area image of FIG. 6A, the three spot pattern illuminating level L1 is shown imaged at area 60. Indexed pixels $P_{25,14}$, $P_{22,18}$, and $P_{28,18}$ represent the observed image of the illuminated spots at level L1. Likewise, in FIG. 6B, indexed pixels $P_{25,13}$, $P_{20,20}$, and $P_{30,20}$ represent the observed image of the illuminated spots of light projected at level L2. And finally, in FIG. 6C, the indexed pixels $P_{25,11}$, $P_{20,22}$, and $P_{32,22}$ represent the observed image of the illuminated spots at level L3. Note that each set of three spots of the different levels define a triangle centered substantially about area 60 in the area images shown in the illustrations of FIGS. 6A, 6B and 6C. Because of the varying angle of orientation of the liquid surface plane, the triangular areas will vary is shape and size.

The three area image samples or frames of the images of FIGS. 6A, 6B and 6C are provided to and processed in the processor 24 to analyze the spot positions within each frame to determine the distance to each illuminated pattern of spots from the camera 22. Using basic triangulation techniques, the height and attitude of the fluid surfaces at the exemplary levels L1, L2 and L3 can be determined using the characteristics determined from the image pattern of the illuminated spots and the spatial relationship between the camera, light source and tank which is known and stored in the processor 24. A suitable flowchart for use in programming the processor 24 for performing the aforementioned tasks is shown in FIG. 7.

Figure 7:
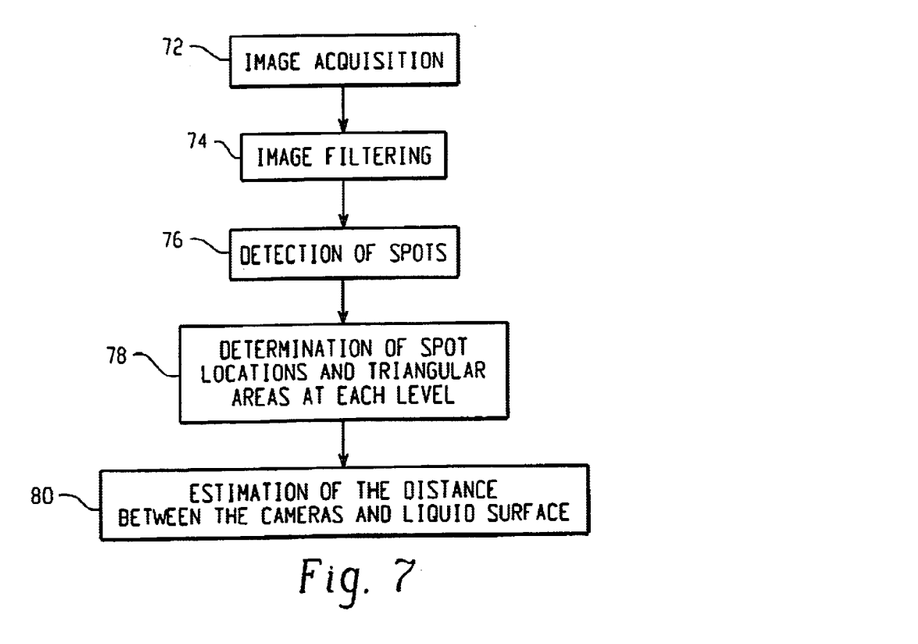
FIG. 7 is a software flowchart suitable for use in programming an image processor used in the embodiment of FIG. 5.

Referring to FIG. 7, in block 72, the pixels of an image are acquired from the digitizer, indexed and stored in the RAM 46. Next, in the block 74, the stored pixels are prefiltered using any one of a number of conventional image pixel gray scale level filtering techniques to sharpen the edges of the illuminated pixels so that they contrast better with the background image pixels. In block 76, the specific pixels illuminated by the light spots are detected. In the present embodiment, this detection process may include a conventional edge detection technique, such as threshold-based, gradient or Sobel operators, for example. In block 78, a location of each spot is determined from the detected pixels. If the spot should cover more than one pixel, then some criteria is used to determine its location in the image. For example, a weighted average based on the gray scale level of the pixels covered by the spot may be used, or merely selecting the pixel location with the largest gray scale level could suffice. In any event, once the locations of the spots in the image are determined, the shape and area of the triangle formed thereby is established in block 78. Since the camera 22 capturing the image is at a fixed and/or known location (the reference location), the area and shape of the triangle formed by the three spots may be used to determine the distance between the camera and the liquid surface. If the attitude of the liquid surface remains substantially the same between captured images, this triangle area would be inversely proportional to the distance between the camera and the liquid surface. Since the locations of the spots and area and shape of the triangle are determined in block 78, then, block 80 need only convert the area and shape of the triangle to a distance and attitude using any one of a number of conventional techniques which provide a unique solution, like a look-up table or neural network, for example.

Figure 8:
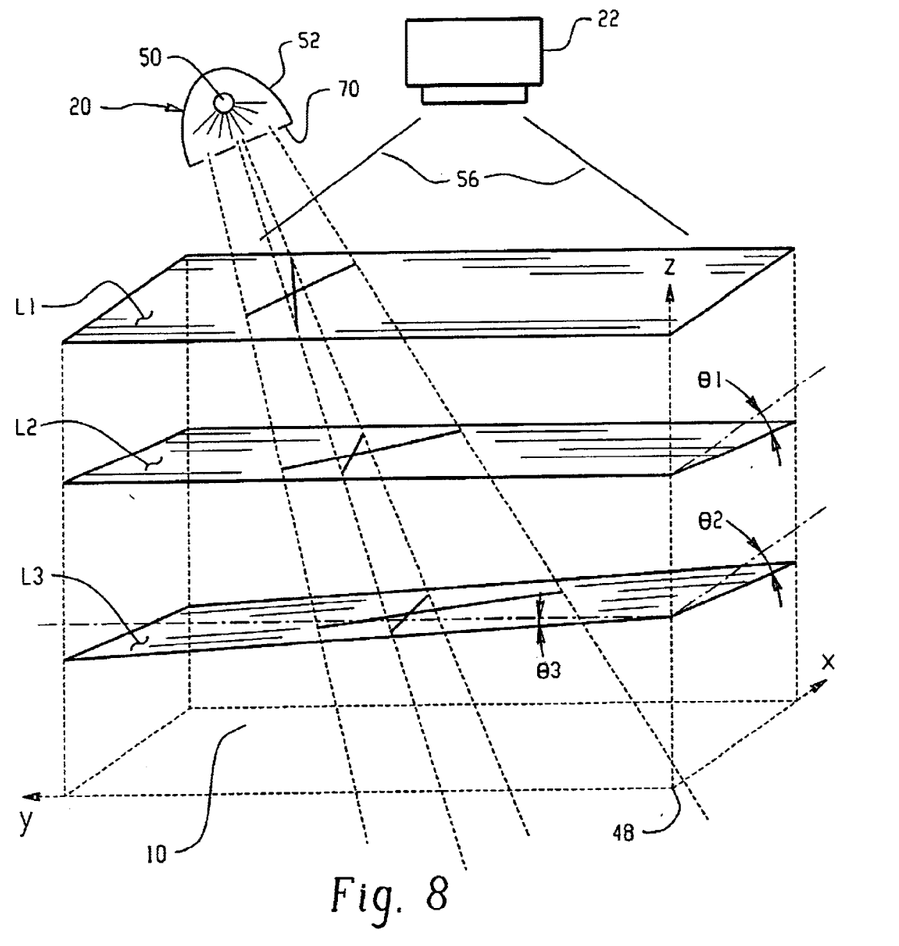
FIG. 8 is an illustration of yet another embodiment of the present invention.
Figure 8A:
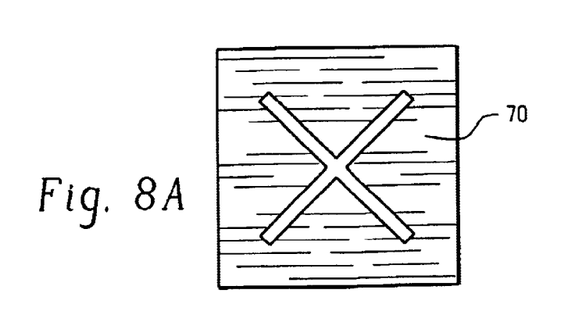

In the embodiment of the present invention in which the surface of the fluid is illuminated with a cross hair light pattern, the processor 24 which may be a PC includes one or more software algorithms for analyzing the digitized pixels of each image frame to compute the distances to each illuminated line segment of the cross hair pattern from a reference point, like the camera position, for example, by analyzing certain characteristics of the line segment images, like the shape, position, and orientation thereof, for example, within the area image or frame of pixels, and to determine the orientation of the fluid plane, i.e. the height and attitude of the fluid surface, based on the determined distances and characteristics of the line segment illuminations. To better understand this aspect of the present invention, the illustration of FIG. 8 depicts the fluid in the tank 10 at three different levels and orientations L1, L2 and L3 similar to the illustration of FIG. 5 described supra. In present example, the light source 20 also includes an incandescent lamp 50, a lamp reflector 52 and a baffle 70 disposed in front of the lamp 50, but the baffle includes a cut out pattern of cross hairs (see FIG. 8A for more detail) to project light to and illuminate the fluid surface at the exemplary levels L1, L2 and L3 with the cross hair illumination patterns represented by the darkened line segments at each level. The dashed lines projected from the light source 20 represent the light pattern projections at the ends of the line segments. The imager 22 includes in its field of image view 56 the portions of the fluid surface that are being illuminated by the line segments covering a spectrum from full to empty levels. Area images of the surface levels L1, L2 and L3 are captured by the imager 22 and digitized, indexed and stored by the frame grabber as described in connection with the circuitry of FIG. 3 or by the PC processor 24 embodiment of FIG. 4 as described supra. These images are provided to the processor 24 for post processing by software algorithms to determine the height and attitude of the exemplary levels L1, L2 and L3 as well as the quantity of fluid in the tank for these levels.

Figure 9A:
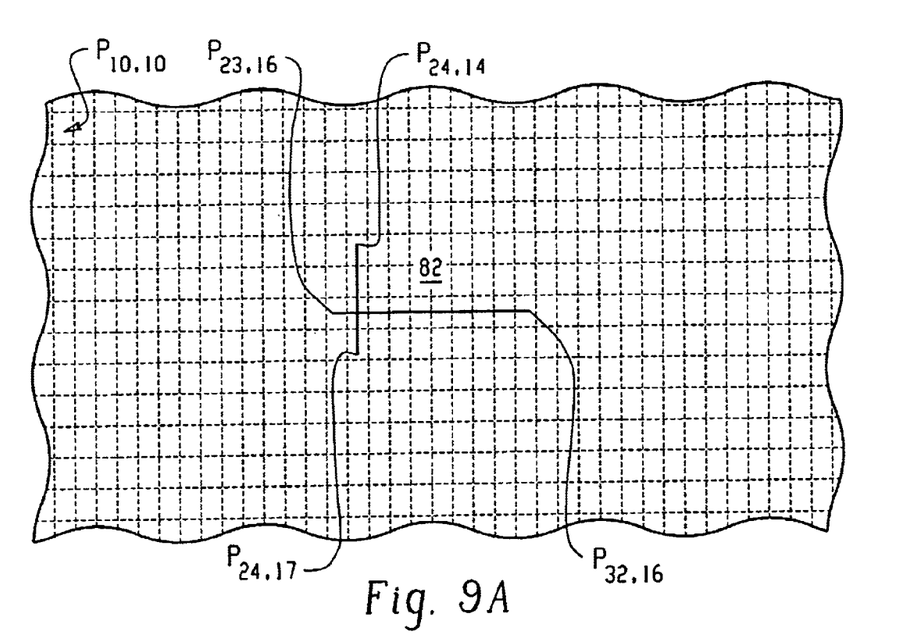
FIGS. 9A, 9B and 9C are illustrations of area images in the form of pixels for various liquid levels exemplifying an operation of the embodiment of FIG. 8.
Figure 9B:
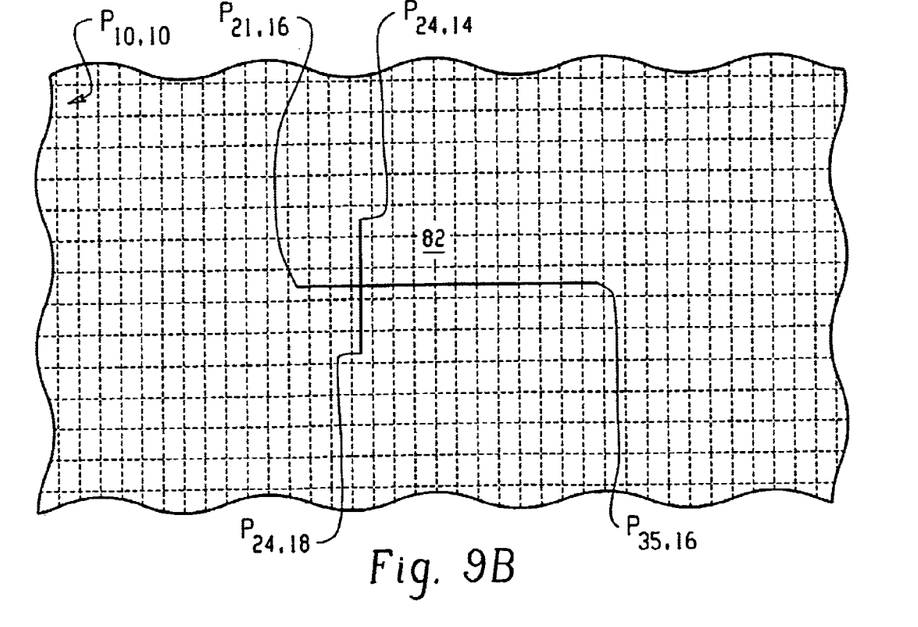
Figure 9C:
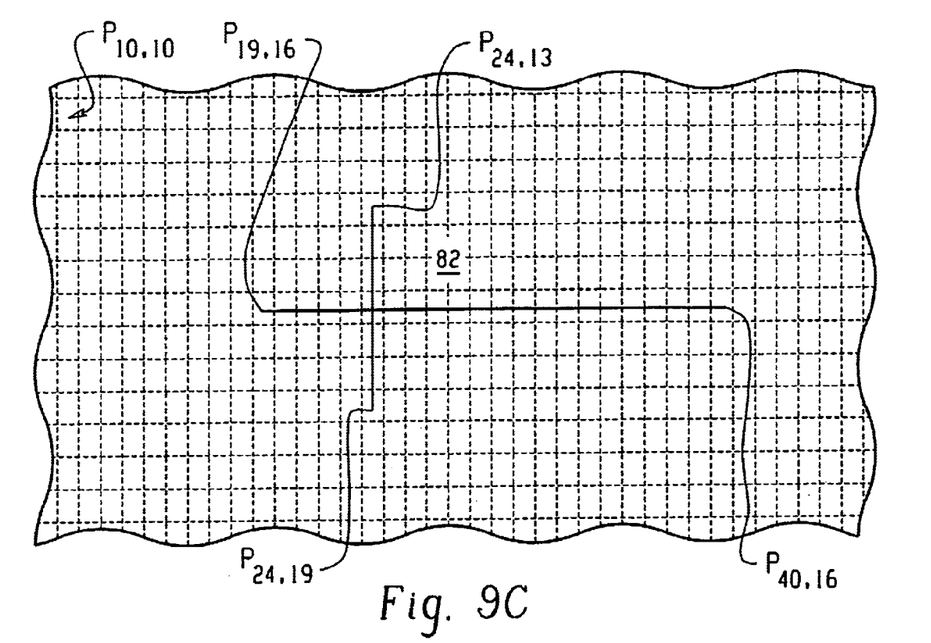

Three area images or frames of pixels observed by the imager 22 at corresponding liquid levels L1, L2 and L3 are shown by way of example in FIGS. 9A, 9B and 9C. In FIGS. 9A, 9B and 9C, indexed pixels designated as $P_{x,y}$ are represented by the small squares similar to the area image illustrations of FIGS. 6A, 6B and 6C. Likewise, the x indexing thereof begins at the top of the area image and increase downwardly and the y indexing begins at the left of the image and increase from left to right. A reference pixel $P_{10,10}$ is shown in the upper left hand corner of the area image. In the image of FIG. 9A, indexed pixels represent the end points of the line segments of the cross hair pattern illuminating level L1 at area 82. Likewise, in FIGS. 9B and 9C, indexed pixels represent the end points of the observed images of the illuminated line segments of light projected on levels L2 and L3, respectively, substantially about area 82. In one embodiment, the length of the line segments of the cross-haired pattern may be determined from the indexed pixels of the endpoints of each line segment. For example, in the image pattern area 82 of the illustration of FIG. 9A, the end point pixels of the vertical line segment are at $P_{24,14}$ and $P_{24,17}$ and the corresponding pixels for the horizontal line segment are indexed at $P_{23,16}$ and $P_{32,16}$. The indexed pixels of the endpoints of the line segments of the other two images shown in FIGS. 9B and 9C may likewise be determined.

The three area image samples or frames of the images of FIGS. 9A, 9B and 9C are provided to and processed in the processor 24 to analyze the line segment characteristics within each frame to determine the distance to each illuminated pattern from the camera 22. Using basic triangulation techniques, the height and attitude of the fluid surfaces at the exemplary levels L1, L2 and L3 can be determined using the determined distances to each illuminated pattern and the spatial relationship between the camera, light source and tank which is known and stored in the processor 24. A suitable flowchart for use in programming the processor 24 for performing the aforementioned tasks is shown in FIG. 10.

Figure 10:
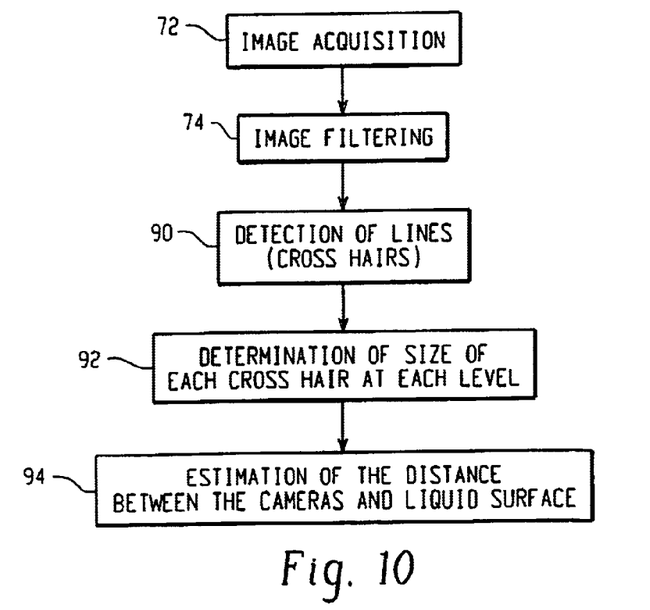
FIG. 10 is a software flowchart suitable for use in programming an image processor used in the embodiment of FIG. 8.

Referring to FIG. 10, the blocks 72 and 74 may be functionally the same or substantially similar to the operations perform for the like reference numeraled blocks of the flow chart of FIG. 7. In block 90, the specific pixels illuminated by the light line segments are detected. In the present embodiment, this detection process may include a conventional edge detection technique, such as threshold-based, gradient or Sobel operators, for example. In block 92, a size and shape of each line segment is determined from the detected pixels. If the line segment illumination should cover more than one contiguous pixel along its length, then some criteria is used to determine its location in the image. For example, a weighted average based on the gray scale level of the pixels covered by the illumination may be used, or merely selecting the pixel location with the largest gray scale level could suffice. In any event, once the locations of the pixels covered by the line segments of the image are determined, the shape and length of each line segment formed thereby is established in block 92. Since the camera 22 capturing the image is at a fixed and/or known location (the reference location), the length of each line segment of the image is inversely proportional to the distance between the camera and the liquid surface. Since the length and shape of each line segment are determined in block 92, then, block 94 need only convert the length and shape of the line segments to a distance and attitude using any one of a number of conventional techniques which provide a unique solution, like a look-up table or neural network, for example.

Figure 11:
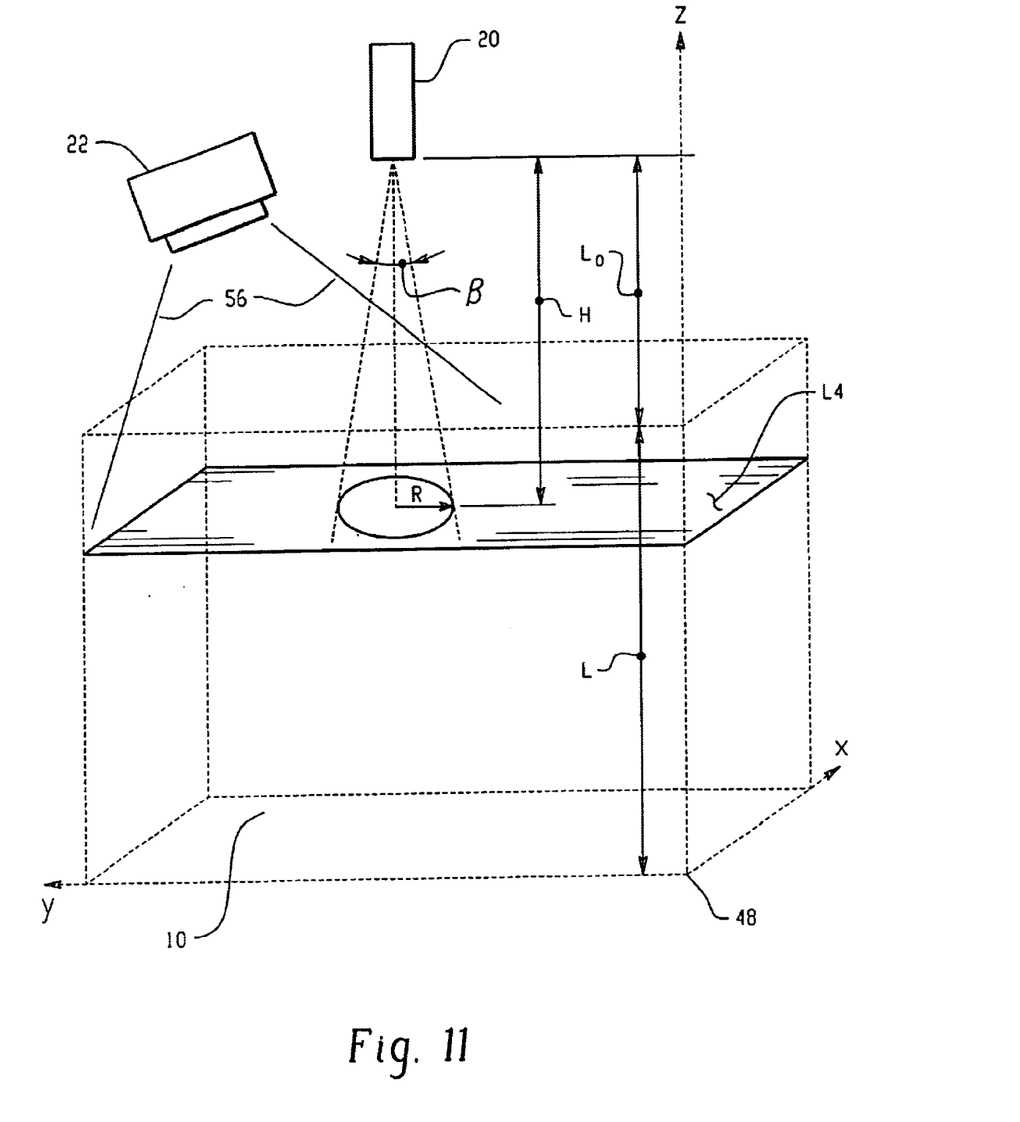
FIG. 11 is an illustration of yet another embodiment of the present invention.

In the embodiment of the present invention in which the surface of the fluid is illuminated with a circular or elliptical light pattern, the processor 24 which may be a PC includes one or more software algorithms for analyzing the digitized pixels of each image frame to compute the distances to each illuminated pattern from a reference point, like the camera position, for example, by analyzing certain characteristics of the circular or elliptical images, like the shape, position, and orientation thereof, for example, within the area image or frame of pixels, and to determine the orientation of the fluid plane, i.e. the height and attitude of the fluid surface, based on the determined distances and characteristics of the circular or elliptical pattern illuminations. To better understand this aspect of the present invention, the illustration of FIG. 11 depicts the fluid in the tank 10 at a level and orientation L4. In present example, the light source 20 may be a laser with a suitable optical assembly to project light conically to and illuminate the fluid surface at the exemplary level L4 with a circular or elliptical illumination pattern represented by the enclosed darkened line segment. The dashed lines projected from the light source 20 represent the conical light pattern projection. The imager 22 includes in its field of image view 56 the portion of the fluid surface that is being illuminated by the conical projection covering a spectrum from full to empty levels. Area images of the illuminated pattern of the surface levels are captured by the imager 22 and digitized, indexed and stored by the frame grabber as described in connection with the circuitry of FIG. 3 or by the PC processor 24 embodiment of FIG. 4 as described supra. These images are provided to the processor 24 for post processing by software algorithms to determine the height and attitude of the exemplary levels as well as the quantity of fluid in the tank for these levels.

The area image samples or frames of the illuminated pattern of FIG. 11 are provided to and processed in the processor 24 to analyze the pattern characteristics within each frame to determine the distance to each illuminated pattern from the camera 22. Using basic triangulation techniques, the height and attitude of the fluid surfaces at the exemplary levels L4 can be determined using the determined distance H to the illuminated pattern and the spatial relationship between the camera, light source and tank L0 and L which are known and stored in the processor 24. A suitable flowchart for use in programming the processor 24 for performing the aforementioned tasks is shown in FIG. 12.

Figure 12:
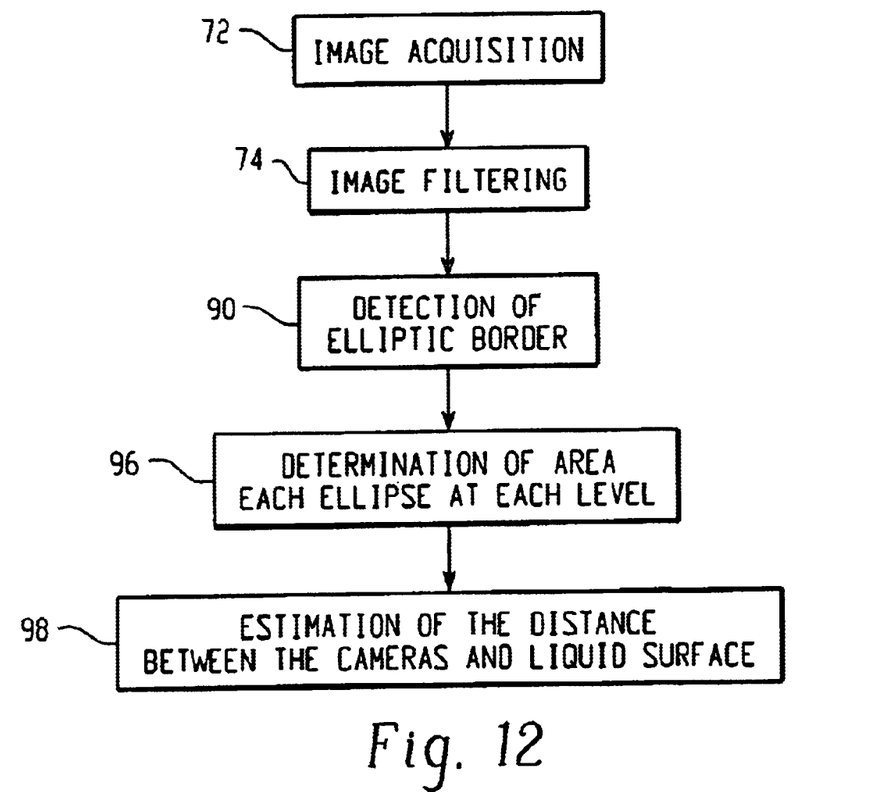
FIG. 12 is a software flowchart suitable for use in programming an image processor used in the embodiment of FIG. 11.

Referring to FIG. 12, the blocks 72, 74 and 90 may be functionally the same or substantially similar to the operations perform for the like reference numeraled blocks of the flow chart of FIG. 10. In block 90, for example the specific pixels illuminated by the enclosed illuminated line segment are detected a similar conventional edge detection technique as that described for block 90 in the flowchart of FIG. 10. In block 96, a size and shape of the enclosed segment is determined from the detected pixels. If the enclosed segment illumination should cover more than one contiguous pixel along its length, then some criteria is used to determine its location in the image. For example, a weighted average based on the gray scale level of the pixels covered by the illumination may be used, or merely selecting the pixel location with the largest gray scale level could suffice. In any event, once the locations of the pixels covered by the enclosed segment of the image are determined, the area or circumference and shape of the enclosed segment formed thereby are established in block 96. Since the camera 22 capturing the image is at a fixed and/or known location (the reference location), i.e. L+L0 from the base of the tank 10, and since the circumference and shape of the enclosed segment are determined in block 96, then, block 98 need only convert the circumference and shape of the enclosed segment to a distance and attitude using any one of a number of conventional techniques which provide a unique solution. For example, knowing the circumference P of a circular illumination pattern, the radius R thereof may be calculated as $P/2\pi$. Then, knowing R and the conical angle $\beta$ of the light projection, the height H to the camera 22 or laser source 20 may be calculated as $R/\tan(\beta)$ and the liquid height is (L+L0)−H.

If the enclosed segment is determined to have a shape other than circular, i.e. level of the liquid is not horizontal, but rather oriented at a pitch and/or roll angle, then the major and minor axes of the elliptical shaped enclosed segment can be used to calculate the distance H and the orientation of the liquid surface plane. It is understood that shapes of illuminated patterns other than ellipses may be also projected on to the surface of the liquid. Accordingly, the pixels of the illuminated pattern be it an ellipse or some other pattern may be similarly identified by the techniques described herein above. Then, some limited number of points or pixels on the periphery of the pattern may be selected and compared to known patterns using a curve fitting or other known technique to identify the shape and size of the pattern which may then be used to determine the distance from the surface to the camera.

For spot or segment illuminations that cover more than one pixel in the area image, some preprocessing of the image frame sample may be performed by the processor 24 to determine the position of the centroid of the spot image in the frame sample before performing any low pass filtering thereof. As an added benefit, some slosh filtering within a frame sample may be performed for those wavelengths of surface waves that are smaller than the size of the illuminated spot or illuminated segment. Assuming a 30 Hz image sample rate, the maximum surface wave frequency is 15 Hz to avoid alias errors. The equation that relates the frequency of surface gravity waves to wave length is $\lambda=g/(2\pi f^2)$ where $\lambda$ is the wave length in feet, g is the acceleration due to gravity (32.17 ft/sec$^2$), and f is the surface wave frequency at a fixed point along the fluid surface. In the present embodiment, the shortest wave length that can be measured without aliasing is 0.273 inches. A rule of thumb that relates maximum surface wave height to wave length is 1:14 (measured from the average level). All aliased waves of a higher frequency will have a maximum height and therefore a maximum error of 0.02 inch and can be safely ignored. It should be noted that the above analysis assumed gravity induced surface waves. For wave lengths less than 0.7 inches, surface tension of the fluid surface plays a significant role. Assuming a worst case upper bound limit that capillary waves do not decrease in height with shortening wave length, the maximum alias error would be 0.7/14 or 0.05 inches, still considered insignificant.

A plane of light intersecting the fluid surface, like the cone section or line segments of the cross hair pattern, for example, generally provides more information within one frame of pixels than one or two light spots. For example, a curved line segment will illuminate the surface and the shape, position and orientation of this segment contains height, slosh, and attitude information. Like for the large spot example described above, the processor 24 can filter fluid surface slosh within one frame, but only in one orientation. A conventional 2-D low pass filter may be suitable for filtering the captured images of the fuel surface that may be corrupted by noise due to liquid slosh, for example.

While the present invention has been described above in connection with a number of specific embodiments, it is understood that such invention and all of its aspects should not be limited in any way to these embodiments, but rather construed in breadth and broad scope in accordance with the recitation of the claim set appended hereto.

We claim:

1. Apparatus for measuring height of a surface of liquid in a container, said apparatus comprising:

a light source disposed above the liquid surface for illuminating the liquid surface with a pattern of light;

means for capturing an area image of said light pattern in a form of discrete picture elements (pixels);

means for indexing the pixels in accordance with their position in the captured area image; and means for processing said indexed pixels of the captured area image to identify a pattern based on a light intensity of the pixels, and for determining the height of said liquid surface in the container based on characteristics of the identified pattern of pixels of said area image.

2. The apparatus of claim 1 wherein the processing means includes means for processing the pixels of the area image to determine attitude of the liquid surface in the container; a memory for storing data representative of the geometry of the container; and means for determining the quantity of liquid in the container based on the determined height and attitude of the liquid and said container geometry data.

3. The apparatus of claim 1 wherein the image capturing means comprises a monochromatic area video camera.

4. The apparatus of claim 1 wherein the image capturing means comprises a solid state imager.

5. The apparatus of claim 4 wherein the solid state imager includes a CCD video camera.

6. The apparatus of claim 4 wherein the solid state imager includes a CMOS video camera.

7. The apparatus of claim 1 wherein the image capturing means is disposed above the liquid surface in a predetermined spatial relationship with the light source.

8. The apparatus of claim 1 wherein the light source includes means for illuminating the liquid surface with a pattern of light that comprises a plurality of spots.

9. The apparatus of claim 8 wherein the pattern of spots includes at least three spots in a non-linear arrangement.

10. The apparatus of claim 8 wherein the illuminating means comprises an incandescent lamp; a reflector for said lamp; and a baffle disposed in front of said lamp containing openings for projecting the pattern of spots on the liquid surface.

11. The apparatus of claim 8 wherein the illuminating means includes at least one laser diode and an arrangement of optical elements for guiding the light from said at least one laser diode to project the pattern of spots on the liquid surface.

12. The apparatus of claim 1 wherein the light source includes means for illuminating the liquid surface with a cross hair pattern of light.

13. The apparatus of claim 12 wherein the light source includes an area illuminator.

14. The apparatus of claim 13 wherein the area illuminator comprises an incandescent lamp; a reflector for said lamp; and a baffle disposed in front of said lamp for projecting the cross hair pattern on the liquid surface.

15. The apparatus of claim 13 wherein the area illuminator comprises an array of light emitting diodes (LEDs) for projecting the cross hair pattern on the liquid surface.

16. The apparatus of claim 1 wherein the light source includes means for projecting a cone of light on the liquid surface to illuminate an elliptical light pattern thereon.

17. The apparatus of claim 1 wherein the image capturing means includes means for capturing the area image at a predetermined image sampling rate.

18. The apparatus of claim 17 wherein the predetermined image sampling rate is a frame sampling rate.

19. The apparatus of claim 1 wherein the determining means uses a size characteristic of the identified pattern in the area image for determining the height of the liquid surface.

20. The apparatus of claim 1 wherein the determining means includes means for determining attitude of the liquid surface based on a shape characteristic of the identified pattern in the area image.

21. The apparatus of claim 1 wherein the processing means includes means for identifying line segment patterns from the indexed pixels of the area image and for determining the height and attitude of the liquid surface based on characteristics of said line segment patterns.

22. The apparatus of claim 21 wherein the height and attitude of the liquid surface is determined based on the shape and size of the line segment patterns in the area image.

23. The apparatus of claim 1 wherein the processing means includes means for identifying an elliptical pattern from the indexed pixels of the area image and for determining the height and attitude of the liquid surface based on characteristics of said elliptical pattern.

24. The apparatus of claim 23 wherein the height and attitude of the liquid surface is determined based on the shape and size of the elliptical pattern in the area image.

25. The apparatus of claim 1 wherein the determining means includes means for selecting points on the periphery of the illuminated pattern and determining the shape and size of the pattern based on said selected points.

26. The apparatus of claim 1 wherein the processing means includes means for slosh filtering of the pixels of the area image.

27. The apparatus of claim 1 wherein the container is an aircraft fuel tank and the liquid comprises fuel.

28. Apparatus for measuring height of a surface of liquid in a container, said apparatus comprising:

a plurality of light sources disposed above the liquid surface, each said light source for illuminating a portion of the liquid surface with a pattern of light;

image capturing means corresponding to each light source of said plurality, each said means for capturing an area image of said light pattern illuminated by its corresponding light source in a form of discrete picture elements (pixels);

means for indexing the pixels of each image capturing means in accordance with their position in the corresponding captured area image; and means for processing said indexed pixels of the captured area image of each image capturing means of said plurality to identify a pattern based on a light intensity of the pixels, and for determining the height of said liquid surface in the container based on characteristics of the identified pattern of pixels of said area images.

29. The apparatus of claim 28 wherein each said light source and its corresponding image capturing device are disposed in a predetermined spatial relationship with each other to function together as a pair for a predetermined portion of the liquid surface; and wherein the processing means processes the pixels of the area image of each image capturing means to determine said heights of the liquid surface for said corresponding predetermined portions.

* * * * *